(12) United States Patent
Ledak

(10) Patent No.: US 6,475,322 B1
(45) Date of Patent: Nov. 5, 2002

(54) SHEET LAMINATION WITH TRANSVERSE SHEET BIAS TO ELIMINATE TRAILING EDGE COATING DEBRIS

(75) Inventor: Stephen M. Ledak, Santee, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/892,217

(22) Filed: Jun. 25, 2001

(51) Int. Cl.[7] .................. B44C 1/165; B32B 31/20; B32B 31/08; B30B 3/00; B30B 15/00

(52) U.S. Cl. .................. 156/238; 156/230; 156/247; 156/289; 156/540; 156/543; 156/580; 156/582; 156/584

(58) Field of Search .................. 156/230, 233, 156/238, 239, 240, 241, 247, 277, 289, 281, 272, 540, 544, 543, 548, 555, 580, 582, 584

(56) References Cited

U.S. PATENT DOCUMENTS

| | | | | |
|---|---|---|---|---|
| 5,169,476 A | * | 12/1992 | Silveira et al. | 156/344 |
| 5,785,795 A | * | 7/1998 | Ryan et al. | 156/344 |
| 6,296,034 B1 | * | 10/2001 | Kodera et al. | 156/540 |

* cited by examiner

Primary Examiner—J. A. Lorengo

(57) ABSTRACT

A method and apparatus for laminating media sheets to remove trailing edge coating debris as the carrier is removed from the laminated sheet involves imparting a transverse force to the laminated sheet to cause the sheet to abruptly straighten as the trailing edge of the sheet passes by a corner of a carrier separation bar at which the carrier is removed. The transverse force may be imparted by guides such as rollers defining a serpentine path through which the laminated sheet must travel.

16 Claims, 2 Drawing Sheets

SHEET LAMINATION WITH TRANSVERSE SHEET BIAS TO ELIMINATE TRAILING EDGE COATING DEBRIS

CROSS REFERENCE TO RELATED APPLICATIONS

None.

BACKGROUND OF THE INVENTION

The present invention relates generally to the art of laminating sheets of media such as copy paper with a protective glossy surface coat and, more particularly, to separating the carrier layer which transports a lamination coat to the media sheet from a lamination stock roll.

Lamination stock comprises a flexible plastic carrier having lamination coat material removably affixed to the carrier. The coating material is a micro thin plastic which includes an adhesive for retaining the coat material on the media to be laminated. The micro thin coating material frequently does not cleanly separate form the trailing edge of a laminated media sheet. Undesirable coating material often extends and subsequently break off in small pieces from the trailing edges of laminated media sheets and the small pieces tend to statically adhere to equipment, clothing and sheets with which they come into contact. This material, known in the industry as TAG, is generally transparent and of extremely light weight due to its thinness and thus tends to contaminate the lamination area and result in imperfections in laminated sheets to which the TAG has adhered. It has been noted that much of the TAG is in the form of a thin tail or tail pieces which extend from the trailing edge of a sheet which has been laminated and from which the lamination carrier has been removed.

It is accordingly an objective of the present invention to improve the lamination process by eliminating TAG particularly at the trailing edge of laminated sheets.

SUMMARY OF THE INVENTION

The present invention therefore provides a method of laminating sheets of media comprising the steps of:
a) feeding a carrier having a lamination coat removably adhered thereon to a bight between opposed lamination rollers;
b) moving a sheet of media to be laminated to said bight in surface to surface contact with said lamination coat;
c) continuing to move said sheet and adhering said lamination coat to said sheet by application of pressure to said media and carrier by said opposed rollers;
d) removing said carrier from a laminated sheet at a point downstream of said rollers; and The present invention further provides an apparatus for laminating a sheet of media comprising:
a) a support for sheets of media to be laminated;
b) a pair of opposed lamination rollers and means for rotating said lamination rollers to move a media sheet and a carrier having a lamination coat thereon in surface to surface contact with said sheet through a bight between said rollers;
c) a carrier separator for guiding movement of said carrier during removal of said carrier from a laminated sheet, said separator having a corner for holding said carrier in engagement with a laminated sheet;
d) a puller for tensioning a carrier around said corner to remove a carrier from a laminated sheet; and
e) a sheet guide to cause a trailing edge of a laminated sheet to resiliently deflect and separate from removed carrier.
e) biasing said moving sheet transversely to a direction of sheet movement to cause a trailing edge of said sheet to resiliently straighten and move away from said carrier as a trailing edge of said sheet passes said point.

DETAILED DESCRIPTION OF THE PREFERRED EMBODIMENT

Figure 1:
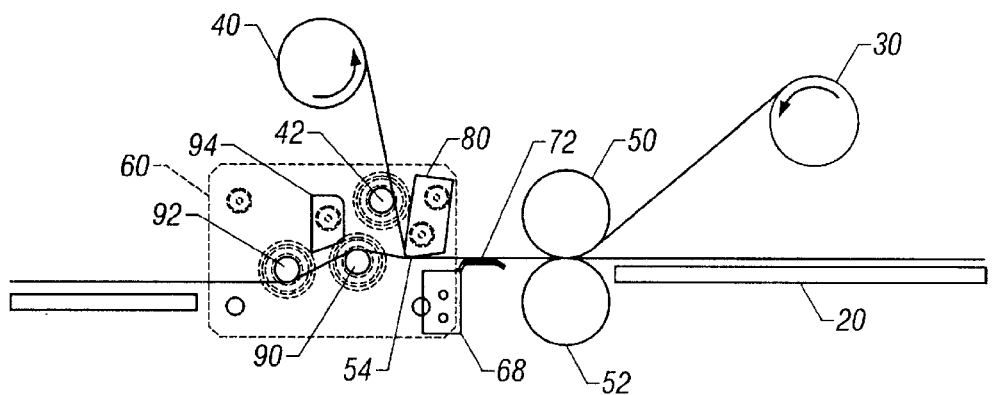
FIG. 1 is a schematic cross section view of a sheet lamination apparatus.
Figure 2:
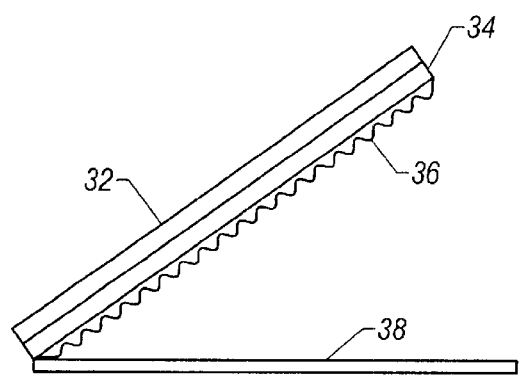
FIG. 2 is an enlarged view of a carrier and removable lamination coat adhered thereon to be applied to a media sheet.

In the following detailed description and in the several figures of the drawing, like elements are identified with like reference numerals.

In the schematic representation of the sheet lamination apparatus seen in FIG. 1, the apparatus 10 includes a media feed tray or shelf 20 from which individual media sheets are transported by suitable sheet moving apparatus (not shown) to be received in a nip or bight between opposed lamination rollers 50, 52. Those skilled in the art will understand that opposed rollers may be replaced by equivalent means such as opposed belts therefore, in this disclosure and the claims, the terms "roller" and "rollers" are intended to broadly encompass ordinary rollers, plural coaxial wheels, moveable belts which are trained around rollers and other mechanical equivalents which perform the same function.

A lamination stock supply reel 30 holds a wound web of layered material comprising a carrier 32 having a lamination coat 34 removably adhered to the carrier layer and adhesive 36 for bonding the lamination material to individual media sheets 38. Typically, the carrier 32 and lamination material as well as adhesive 36 are a clear plastic sheet material which adheres due to the adhesive to the laminated sheet from which the carrier 32 is then removed and would onto a take-up reel 40 after the media sheet 38 has been laminated. One or more guide rollers 42 serve to assist transport of the carrier 32 to the take-up reel 40. One or both of the lamination rollers 50, 52 may be heated to a temperature not exceeding about 160° C. to simultaneously apply heat and pressure not exceeding about 4 lbs./sq. inch to the lamination web and media sheet 38 to bond the lamination coat 34 to the sheet 38.

A carrier separator bar 80 is positioned downstream from the opposed lamination rollers 50, 52 and has a sharp edge or corner 54 around which the carrier 32 is bent during removal and transport of the carrier which is pulled by powered rotation of the take-up reel 40.

Figure 3:
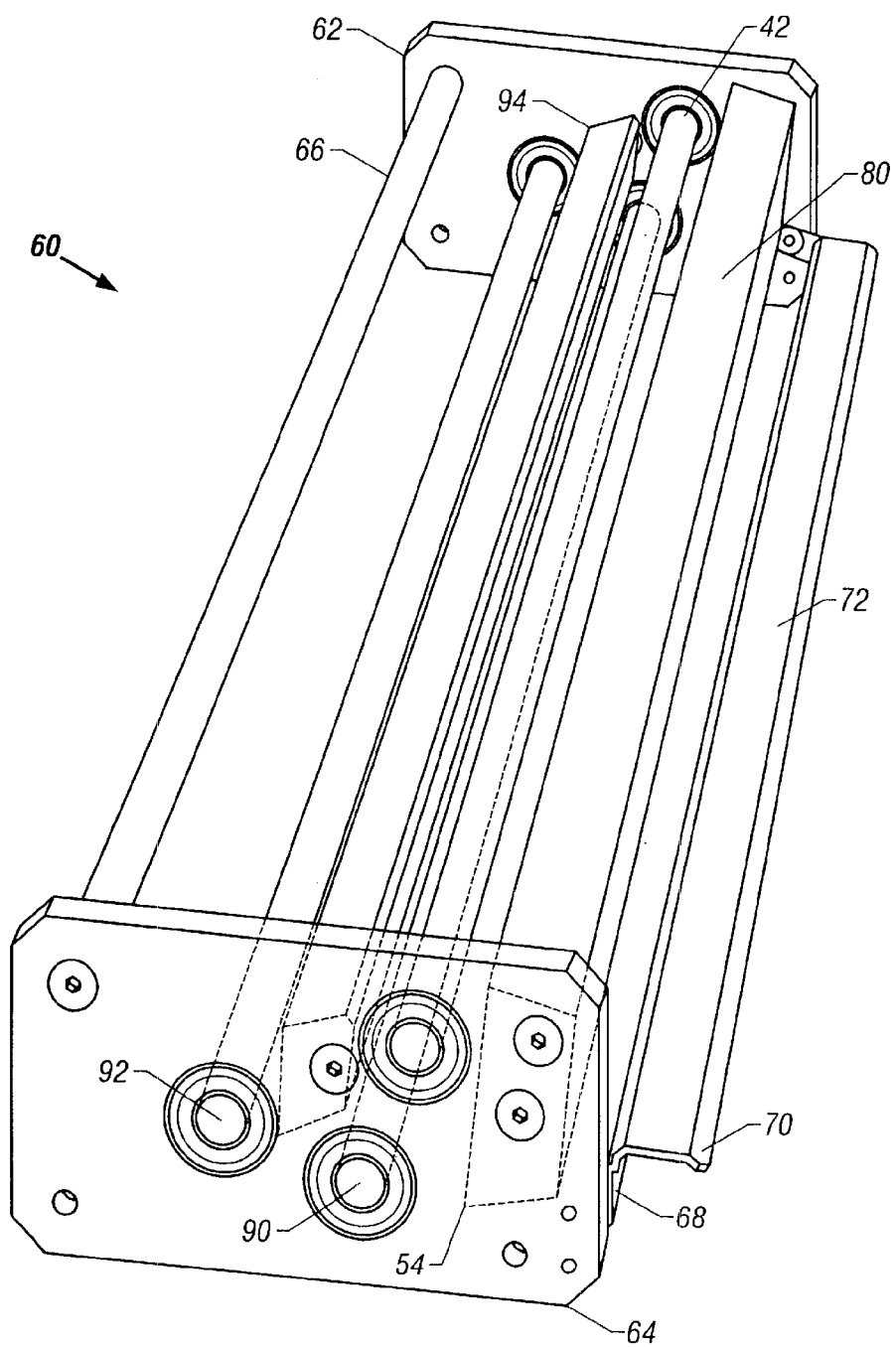
FIG. 3 is a perspective view of a sheet biasing apparatus.

As seen in FIG. 3, downstream of the lamentation rollers 50, 52 a sheet biasing apparatus is provided which may be a roller frame 60 comprised of spaced and pieces 62, 64 and transverse members 66, 68 affixed to the end pieces 62, 64. The frame supports the separator bar 80 and a feed lip or shelf 70 which, as shown, is part of transverse member 68, having an upper surface 72 generally aligned in the direction of media travel with the lowest corner of the separator bar 80 for receiving and guiding the laminated sheet 38 to the separator bar 80.

In the presently preferred embodiment, downstream of the separator bar 80 media guide rollers 90, 92 and a deflector bar 94 all supported on the frame 60 together define a generally serpentine path through which the media must travel. The bend imparted to the media sheet transversely biases the moving media sheet such that the trailing edge of the sheet, upon passing by the separator bar 80 is caused to move in a direction generally transversely (upwardly or downwardly as shown, for example) to the path in which the media sheet passes the lower edge of the separator bar 82 because the trailing edge of the media sheet 38 resiliently straightens as it passes the separation corner on the separator bar 80 at which the carrier 32 also abruptly changes direction during passage to the take-up reel 40.

In the embodiment seen in FIG. 1, the media sheet is bent in a direction to cause the trailing edge to deflect substantially upwardly parallel to the removed carrier 32. It is of course possible to orient the guide rollers 90, 92 and deflection bar 94 to bend the sheet such that the trailing edge resiliently straightens downwardly instead of upwardly away from the separation corner of the carrier bar 80 so that the trailing edge of the sheet deflects downwardly away from the removed carrier. In the embodiment shown, the transverse bias is applied to the sheet by use of rollers 90, 92 and the deflection bar 94 which may nave a curved lower surface which provides a curved guide between the rollers 90, 92. Means other than rollers and a deflection bar for biasing the sheet in a direction substantially transverse to its path of movement can be envisioned. For example, transversely extending blocks having a square or other angular configuration designed to urge the trailing edge of the media sheet 38 in a direction to effectuate a clean separation from the carrier 32 without trailing edge TAG.

The deflection apparatus produces a transverse bend in the media sheet 38 which causes the trailing edge of the sheet to abruptly snap or move away from the corner of the separator bar 80 at which the carrier 32 is removed The inherent resilience of the laminated media sheet 38 causes an abrupt "snapping" action which substantially eliminates the objectionable trailing edge debris known as TAG.

Persons skilled in the art will also appreciate that various additional modifications can be made in the preferred embodiment shown and described above and that the scope of protection is limited only by the wording of the claims which follow.

What is claimed is:

1. A method of laminating sheets of media comprising the steps of:
   a) feeding a carrier having a lamination coat removably adhered thereon to a bight between opposed lamination rollers;
   b) moving a sheet of media to be laminated to said bight in surface to surface contact with said lamination coat;
   c) continuing to move said sheet and adhering said lamination coat to said sheet by application of pressure to said media and carrier by said opposed rollers;
   d) removing said carrier from a laminated sheet at a point downstream of said rollers; and
   e) biasing said moving sheet to move a trailing edge of said sheet at said point transversely to a direction of sheet movement to cause said trailing edge of said sheet to resiliently straighten and move away from said carrier as said trailing edge of said sheet passes said point.

2. The method of claim 1, wherein said media sheet is biased in a direction to cause said trailing edge to deflect toward said removed carrier.

3. The method of claim 1, wherein said media sheet is biased in a direction to cause said trailing edge to deflect away from said removed carrier.

4. The method of claim 1, comprising holding said carrier in contact with said sheet moving in a first direction and pulling said carrier away from said sheet in a second direction which intersects said first direction at an exterior angle not less than about 85°.

5. The method of claim 4, comprising the step of using a rotating carrier take up toll to pull said carrier in said second direction.

6. The method of claim 5, including applying lamination pressure to said carrier and said sheet at said bight not exceeding about 4 lbs./sq. inch.

7. The method of claim 6, further comprising the step of heating at least one of said rollers to a temperature not exceeding about 160° C. during application of said pressure.

8. Apparatus for laminating a sheet of media comprising:
   a) a support for sheets of media to be laminated;
   b) a pair of opposed lamination rollers and means for rotating said lamination rollers to move a media sheet and a carrier having a lamination coat thereon in surface to surface contact with said sheet through a bight between said rollers;
   c) a carrier separator for guiding movement of said carrier during removal of said carrier from a laminated sheet, said separator having a corner for holding said carrier in engagement with a laminated sheet;
   d) a puller for tensioning a carrier around said corner to remove a carrier from a laminated sheet; and
   e) a sheet guide to cause a trailing edge of a laminated sheet moving in a direction away from said carrier separator to resiliently deflect at said carrier separator away from said direction and separate from removed carrier.

9. The apparatus of claim 8, wherein said sheet guide comprises spaced guides for bending a moving generally planar sheet transverse to the direction of movement of the sheet to urge a trailing edge of the sheet transversely of the plane of the sheet.

10. The apparatus of claim 9, wherein said sheet guides include an angled surface positioned for engaging the leading edge of a sheet moving from said carrier separator.

11. The apparatus of claim 10, wherein said angled surface is arcuate.

12. The apparatus of claim 11, comprising a roller positioned transversely to the direction of movement of a sheet, said arcuate surface being on said roller.

13. The apparatus of claim 12, wherein said guides further comprise a second roller and a curved guide between said rollers.

14. The apparatus of claim 10, wherein said puller comprises a rotatable carrier take up roll.

15. The apparatus of claim 14, wherein said separator comprises a bar extending parallel to said rollers, said corner having an interior angle at said corner of not more than about 95°.

16. The apparatus of claim 15, wherein said separator bar has a corner radius not exceeding about 0.50 mm.

* * * * *